United States Patent [19]
Tavss et al.

[11] Patent Number: 5,407,742
[45] Date of Patent: Apr. 18, 1995

[54] PASTE DISPENSING CONTAINER

[75] Inventors: Edward A. Tavss, Kendall Park; John Santalucia, New Brunswick; Richard S. Robinson, Piscataway, all of N.J.

[73] Assignee: Colgate-Palmolive Company, Piscataway, N.J.

[21] Appl. No.: 830,104

[22] Filed: Feb. 3, 1992

[51] Int. Cl.6 .................. B65D 35/08; B65D 35/14
[52] U.S. Cl. .................. 428/34.2; 428/34.3; 428/35.3; 428/35.4; 428/35.7; 428/35.9; 428/36.6; 428/36.9; 428/36.91; 428/480; 428/483; 428/458; 222/107; 525/184
[58] Field of Search ............ 428/34.2, 35.1, 36.6, 428/36.7, 520, 34.3, 521, 35.9, 516, 480, 483, 458, 464, 537.5, 36.9, 36.91, 36.92, 35.3, 35.4, 35.7; 525/184; 222/107

[56] References Cited

U.S. PATENT DOCUMENTS

| | | | |
|---|---|---|---|
| 3,295,725 | 1/1967 | Brandt | 222/107 |
| 3,931,757 | 2/1976 | Seyal et al. | 525/173 |
| 4,082,854 | 4/1978 | Yamada et al. | 428/520 |
| 4,096,202 | 6/1978 | Farnham et al. | 525/64 |
| 4,243,712 | 1/1981 | Hoheisel et al. | 428/35.1 |
| 4,261,473 | 4/1981 | Yamada et al. | 428/520 |
| 4,261,482 | 4/1981 | Yamada et al. | 428/36.6 |
| 4,327,726 | 5/1982 | Kwong et al. | 604/262 |
| 4,369,280 | 1/1983 | Dieck et al. | 525/281 |
| 4,595,612 | 6/1986 | Tavss et al. | 222/92 |
| 4,595,613 | 6/1986 | Tavss et al. | 428/34.2 |
| 4,792,061 | 12/1988 | Nishida | 222/107 |
| 4,857,576 | 8/1989 | Kochi et al. | 525/184 |
| 4,877,813 | 10/1989 | Jinno et al. | 525/184 |
| 4,951,841 | 8/1990 | Tavss et al. | 428/36.6 |
| 5,035,349 | 7/1991 | Donahue | 222/107 |
| 5,043,384 | 8/1991 | Lavengood | 525/184 |
| 5,053,258 | 10/1991 | Booze et al. | 525/184 |

FOREIGN PATENT DOCUMENTS 728525 2/1966 Canada.

Primary Examiner—Ellis P. Robinson
Assistant Examiner—Rena L. Dye

[57] ABSTRACT

A structure which is useful for making containers for dentifrices, such as tubes, is comprised of a structure where the layer which contacts the dentifrice consists of a blend of polybutylene terephthalate and polyethylene. Other layers can consist of adhesives, paper, foils, other polymers and the like depending on the properties desired. A polybutylene terephthalate-polyethylene layer has been found to have a low degree of absorption of flavorant.

8 Claims, 1 Drawing Sheet

PASTE DISPENSING CONTAINER

BACKGROUND OF THE INVENTION

The present invention relates broadly to a container having an inner surface of a blend of polybutylene terephthalate and polyethylene. The invention is more particularly concerned with a dispensing container of a multilayer construction the innermost layers being a blend of polybutylene terephthalate and polyethylene whereby product permeation and absorption, and oxygen absorption, are substantially prevented in the regions of the container with this structure.

Tubes formed of metallic and plastic materials have long been known in the packaging field. Extruded metal tubes are inherently brittle and repeated use not infrequently results in wall cracks so that product is exuded from a location other than the essentially rigid dispensing orifice. Of the prior art metal tubes, aluminum tubes, while probably being the least brittle, are somewhat limited in their applications since up to the present time it has not been possible to apply to the interior surfaces thereof a completely satisfactory coating. A coating is required to prevent attack and corrosion of the metal by alkaline or acid contents and contamination of the contents by the reaction products. Notwithstanding the relatively brittle nature of a metal tube, the mentioned internal coating operation requires an additional processing step which necessarily increases the cost of the final article.

Tubes formed of polyethylene and other plastic materials have enjoyed wide commercial success in the packaging of many products. These are both singe layer and multi-layer tubes. However, certain products after a time have been noted to deteriorate when contained in polyethylene. Plastics as exemplified by polyethylene are to a degree permeable to organics when employed in the relatively low wall thicknesses used in tubular containers. This results in the flavor oils embodied in most dentifrices being reduced in volume during rendering the dentifrice less palatable.

One solution has been proposed to provide a relatively thin metallic foil barrier between the product and the polyethylene tube body to prevent the mentioned loss of essential oils and the absorption of oxygen. The metallic barrier has been suggested as an interlayer between facing sheets of polyethylene, and the laminate be formed by heat with or without suitable adhesives. However, while a structure of this general character is effective to prevent some product permeation and oxygen absorption through the tube body, the tube must be of a laminate construction. It cannot be extruded or blow molded.

U.S. Pat. No. 4,243,712 discloses the use of plastic tubes made from polyethylene terephthalate. This is stated to be a flavor barrier. However, the main use for the tubes is as a shrink film. There is no disclosure to use of this film with pastes. Further, there is no disclosure of the use of this film to make tubes to hold and dispense dentifrices. In addition, there is no disclosure to use a blend of polybutylene terephthalate and polyethylene.

U.S. Pat. No. 4,327,726 also discloses a tube comprised of polyethylene terephthalate. This is similar to a related disclosure in U.S. Pat. No. 4,009,734. In each instance, the polyethylene terephthalate tube is used as a conduit means. It is not used to contain a dentifrice or a related flavored substance. Further, there is no disclosure in these patents to use a blend of polybutylene terephthalate and polyethylene. In particular, there is no disclosure with regard to the synergism when a blend of polybutylene terephthalate and polyethylene is used. The flavor oil absorption by the blend is less than when either polyethylene or polybutylene terephthalate is used alone.

U.S. Pat. No. 3,295,725 discloses a laminated collapsible dispensing container. This container has a metallic barrier and a polyethylene inner wall. The laminates that are disclosed in this patent make acceptable dispensing tubes, however, these dispensing tubes suffer from a high absorption of flavorant oils. This is illustrative of the prior art problem.

U.S. Pat. No. 4,595,612 discloses the structure of a toothpaste dispensing tube which has as the inner layer a layer of polyethylene terephthalate. This polyester produces a good tube laminate and absorbs less flavor oil than a polyethylene barrier layer. However, there is not disclosed the use of polybutylene terephthalate nor the use of a polybutylene terephthalate polyethylene blend as the structural layer for a toothpaste dispenser that is in contact with the paste.

Canadian Patent 728,525 discloses the use of a metal layer coated with polyethylene for use in making dentifrice dispensing tubes. However, as has been pointed out polyethylene will absorb a large amount of the flavorant oils in a dentifrice composition. This patent also illustrates the prior art problem.

A further disadvantage in a polyethylene surface resides in the inability of the surface to readily receive printing or decorative material. In addition, polyethylene has a memory property, that is, it does not remain compressed when squeezed. This is a disadvantage for some dentifrice tubes. To counter such a lack of deformability the metal layer must be relatively thick so that deformability is imposed on the plastic so as to overcome its memory.

All of this can be overcome through the use of a blend of polyethylene and polybutylene terephthalate. Such a blend has properties superior to those of polyethylene alone or polybutylene terephthalate alone. The blend exhibits a synergism with regard to a significant decrease in the degree of absorption of flavorants from liquids and pastes and is more readily suitable.

SUMMARY OF THE INVENTION

It is, therefore, a primary objective of the present invention to provide containers, and in particular dispensing containers of single layer or multi-layer wall construction which have a decreased degree of flavorant absorption through the use of a polybutylene terephthalate-polyethylene blend as the innermost surface of the container.

Another object of this invention lies in the provision of a tubular container having a plurality of layers in the body portion, one of these layers being a polybutylene terephthalate-polyethylene blend. This layer is preferably innermost adjacent the dentifrice, and may also be the outermost layer, with the possibility of different additional laminae sandwiched therein between. Optionally, one layer can be a metallic foil layer. Additional layers can comprise other polymers and suitable adhesive and bonding agents such as copolymers of ethylene and acrylic acid. A paper layer that contains print material can also be included.

A further objective is a film comprised of a polybutylene terephthalate polyethylene blend that has a low permeability and absorptivity for flavorant and related organic oils. The films can contain other additives.

The containers can be formed from a laminate stock, co-extruded or blow molded. The technique used will depend to a large degree on the structure of the material.

The use of a blend of polybutylene terephthalate and polyethylene has a synergistic effect with regard to the absorption of flavorant oils and related substances from liquids and pastes. That is, the absorption of flavorant oils and related substances is less when the blend of polybutylene terephthalate and polyethylene is used than when either polybutylene terephthalate or polyethylene is used alone. This is the essence of the discovery.

DETAILED DESCRIPTION OF THE INVENTION

Figure 1:
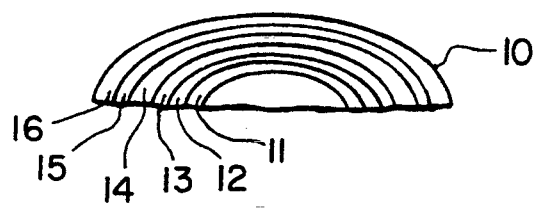
FIG. 1 is a cross-sectional view of a fragmentary portion of various multi-layer embodiments of the polybutylene terephthalate-polyethylene barrier material.

Referring now first to FIG. 1 of the drawings, a substrate 10 is shown in cross-section to reveal possible components that can be used to form a multi-layer tube construction configuration.

The innermost layer 11 is a layer of the blend of polybutylene terephthalate and polyethylene. This layer Will contact the contained liquid or paste. In most instances, it will be a paste such as a toothpaste. The next layer 12 is usually an adhesive layer. This adhesive layer bonds the polybutylene terephthalate and polyethylene blend layer with another layer such as an optional metal foil later 13, such as aluminum foil. A metal foil layer will be used in laminate construction where the tube is to remain collapsed after being deformed. The metal foil counteracts the memory property of the plastic layers. This metal layer also has barrier properties for oxygen and for organics such as flavorant oils. However, in a container that is not to be deformed a metal foil layer will in most instances be deleted. The layer 14 is another adhesive layer that secures the other side of the optional metal foil layer to an optional paper layer 15. The topmost layer 16 can be of a wide range of materials, but it will usually be constructed of the same material of layer 11. The could, however, be any polyene such as polyethylene or polypropylene, or a blend of these polyenes. If the same as the innermost layer, it will be a layer of a blend of polybutylene terephthalate and polyethylene.

Essentially any adhesive may be used to bond the different layers of a multi-layer structure together. Preferred adhesives would be a copolymer of ethylene and acrylic acid or methacrylic acid, or sodium or zinc salts thereof in a diluent system.

The metal foil, when one is used, is preferably an aluminum foil. The paper layer when one is used, is desirably a kraft paper.

In the form of a laminate that contains a metal foil and is thus used to make deformable containers, the thickness range of each of the layers preferably is as follows:

Polybutylene terephthalate-polyethylene blend layer 11, 0.5 mils to 3 mils, and preferably 1 mils.
Adhesive layer 12—sufficient to assure adherence
Metal foil layer 13—0.5 mils to 2 mils, and preferably 1 mils
Adhesive layer 14—sufficient to assure adherence
Paper layer 15—1.5 mils to 2.5 mils, and preferably 2 mils.

Polybutylene terephthalate-polyethylene layer 16 will have a thickness similar to that of the first layer of polybutylene terephthalate-polyethylene blend. In the form of a film that can be used as a container liner the film will have a thickness of about 1 to 50 mils. As a stand alone container the polybutylene terephthalate-polyethylene blend will have a thickness of about 0.01 to 0.25 inches. The thickness will depend on the particular container and its particular usage.

Figure 2:
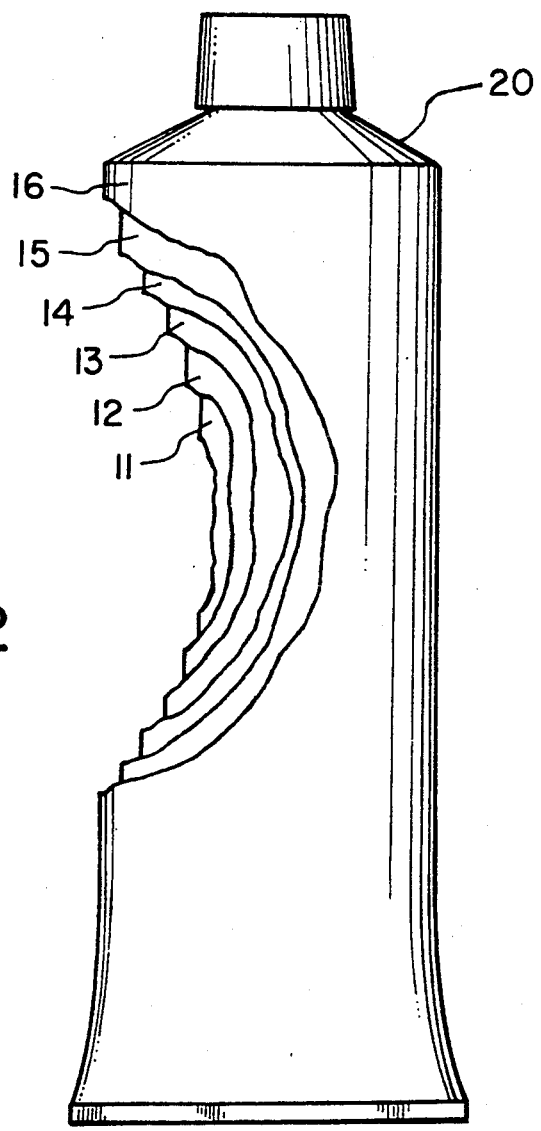
FIG. 2 is a side elevational view of a dispensing container having a multi-layer structure, with portions of the body walls being broken away to more fully illustrate the structure.

FIG. 2 is an example of the structure of a tubular container using the layer structure demonstrated in FIG. 1, with layer 11 being innermost. The tube container may be constructed solely of layer 11, but preferably is of a multi-layer structure. The layer 11 has the barrier properties for flavorant oils and is the only essential layer. When used as a storage container for flavorant oils, or for pastes containing flavorant oils, a single layer of the blend of polybutylene terephthalate and polyethylene can be used. This can be the liner for a fiberboard container or can constitute the full structure of the container.

It is believed, clear from the foregoing, that there is provided a container structure which substantially reduces the problem of flavor oil loss. The structure of the tube body and shoulder piece 20 using a blend of polybutylene terephthalate and polyethylene as a barrier eliminates product permeation and this highly desirable result is achieved by the use of a low cost material.

When also used as the outer layer a polybutylene terephthalatepolyethylene blend is capable of fusion during a side seaming step. This is important for laminate tubes. The techniques for seaming dentifrice tubes of the general type that is disclosed is illustrated in U.S. Pat. No. 3,295,725 and is incorporated herein by reference.

An outer layer of polybutylene terephthalate-polyethylene blend may be eliminated if other layers are of sufficient thickness to resist damage, or through the use of a different polymer layer, or by inserting a thermoplastic material into the overlap side seam during the sealing to form the tube structure.

As has been discussed, the polybutylene terephthalate-polyethylene blend can be used as a single layer or a multi-layer. The containers that are formed can be film containers or rigid containers. In most uses, a multi-layer structure will be used to get the advantage of the different layers. This can be layers of polymers, layers of polymers and other materials, or a layer of this film blend on a paperboard and thus to function as a liner. In addition, the blend alone can be used for the components of a dentifrice pump dispenser inclusive of the barrel, piston, diaphragm, nozzle, spout and the like. However, a particular use is in dentifrice tubes, and in particular multi-layer dentifrice tubes. These tubes can be of a laminate, extrusion or blow molded structure. When metal foil and/or a paper layer is included they will be of a laminate construction. Extrusion or blow molding can be used to produce single or multi-layer structures when all layers are polymeric layers.

Various modifications of the invention have been disclosed and these and other changes can be made without departing from the novel concepts of the present invention. For instance, when cast as a film on the interior surfaces of fiber drums used for the storage of flavored dentifrice, the material will retard flavor loss into the drums, thereby extending storage life. In addition, storage bags for food and other substances can be formed from this blend. Gravies, sauces, soups, syrups and the like can be stored in polybutylene terephthalate-polyethylene blend bags and bag in a box packaging. Household products and various personal care products also can be packaged using this film blend. A blend of this film can also be used as a liner for cans for automotive oil. The discovery is the unique barrier properties of the polybutylene terephthalate-polyethylene blends. The use as a multi-layer film is a preferred mode of use. In this way, the properties of various layers can be combined. Some are present for strength or to prevent puncturing. Others have barrier properties. Such laminate or co-extruded structures, or blown films, have many uses. In addition, as noted above, polybutylene terephthalate-polyethylene blends can also be used as monolayers. However, the preferred use is in dentifrice tubes and in a multi-layer form. This is the case since flavor is important in dentifrices. Considering aging time after packaging, shelf time and the time to use a tube of dentifrice, six months to a year can elapse. Stability of the dentifrice during this period of time is important.

The blend of polybutylene terephthalate and polyethylene will contain from about 80 to 99 percent by weight polybutylene terephthalate to 1 to 20 percent by weight polyethylene, and preferably about 94 to 98 percent by weight polybutylene terephthalate and 2 to 6 percent by weight of polyethylene. The blend is formed by heating a mixture of polybutylene terephthalate and polyethylene to a melt and forming a blend. This blend is then extruded to form a film or container or otherwise formed by extrusion or blow molding or injection molding to form the container.

The following tables show the synergistic effect of a single layer film that is a blend of polybutylene terephthalate and polyethylene versus the use of a polybutylene terephthalate film alone or a polyethylene film alone. It would be expected that the blend combination would have properties between those of the two components. However, the blend combination is superior to either of the blend components used alone. The evaluations in these tables were conducted by encapsulating a sample of a dentifrice paste and of a flavor oil in an enclosure of each polymer film and of the polymer film blends and after three weeks at 90° F. determining the amount of flavorant absorbed by the particular film. In each instance, the film is the same thickness.

TABLE I

| Adsorption Of Flavor From A Dentifrice Paste | |
|---|---|
| | Absorption (%) |
| PBT | 0.80 ± 0.02 |
| PBT + 3% low density polyethylene | 0.70 ± 0.02 |
| PBT + 3% medium density polyethylene | 0.67 ± 0.03 |
| PBT + 3% high density polyethylene | 0.66 ± 0.02 |
| Low density polyethylene | 2.80 ± 0.07 |

TABLE I-continued

| Adsorption Of Flavor From A Dentifrice Paste | |
|---|---|
| | Absorption (%) |
| PBT is polybutylene terephthalate | |

TABLE II

| Absorption of Neat Flavor Oil | |
|---|---|
| | Absorption (%) |
| PBT | 0.60 ± 0.03 |
| PBT ± 3% low density polyethylene | 0.44 ± 0.02 |
| PBT ± 3% medium density polyethylene | 0.38 ± 0.02 |
| PBT ± 3% high density polyethylene | 0.30 ± 0.03 |
| Low density polyethylene | 4.53 ± 1.05 |

In these tables, it is clear that the blend of polybutylene terephthalate and polyethylene has a synergistic effect over the use of polybutylene terephthalate or polyethylene alone. This is the case whether the blend contains low density, medium density or high density polyethylene. Such synergism is unexpected. It would be expected that the values for the blend would fall between those of the components. However, this did not occur. The blend is superior to either of the components.

What we claim is:

1. A paste dispensing container comprising an enclosed space, wherein the innermost surface of said container contacting said paste being of a polymer blend of polybutylene terephthalate and polyethylene wherein said polybutylene terephthalate comprises about 80 to 99 percent by weight of said polymer blend and said polyethylene about 1 to 20 percent by weight of said polymer blend whereby said container has an absorbtivity for organic components of a paste less than that of either polybutylene terephthalate or polyethylene alone.

2. A paste dispensing container as in claim 1 wherein said polybutylene terephthalate constitutes from about 94 to 98 percent by weight of said polybutylene terephthalate-polyethylene blend.

3. Paste dispensing container as in claim 1 wherein adjacent to said innermost surfaces is a layer of a metal foil.

4. Paste dispensing container as in claim 3 wherein said metal foil is aluminum foil.

5. Paste dispensing container as in claim 3 wherein adjacent to said metal foil is a layer of paper.

6. Paste dispensing container as in claim 5 wherein adjacent to said layer of paper is a layer of thermoplastic.

7. A paste dispensing container containing a paste having organic components, said container comprising an enclosed space, wherein the innermost surface of said container contacting said paste being of a polymer blend of polybutylene terephthalate and polyethylene wherein said polybutylene terephthalate comprises about 80 to 99 percent by weight of said polymer blend and said polyethylene about 1 to 20 percent by weight of said polymer blend whereby said container has an absorbtivity for organic components of a paste less than that of either polybutylene terephthalate or polyethylene alone.

8. A paste dispensing container as in claim 7 wherein said polybutylene terephthalate constitutes from about 94 to 98 percent by weight of said polybutylene terephthalate-polyethylene blend.

* * * * *

UNITED STATES PATENT AND TRADEMARK OFFICE
CERTIFICATE OF CORRECTION

PATENT NO. : 5,407,742
DATED : Apr. 18, 1995
INVENTOR(S) : Edward A. Tavss, et al It is certified that error appears in the above-indentified patent and that said Letters Patent is hereby corrected as shown below:

On title page, item [63] add the following:

—This application is a continuation-in-part of U.S. Application Serial NO. 07/484,711, filed February 26, 1990, now abandoned.—

Signed and Sealed this

Nineteenth Day of September, 1995

Attest:

BRUCE LEHMAN

*Attesting Officer*         *Commissioner of Patents and Trademarks*